May 29, 1956  M. BAERMANN  2,747,944
BEARINGS FOR INSTRUMENTS AND MACHINES
Filed Sept. 16, 1953  2 Sheets-Sheet 1

INVENTOR:
Max Baermann
BY
ATTORNEYS

May 29, 1956     M. BAERMANN     2,747,944
BEARINGS FOR INSTRUMENTS AND MACHINES
Filed Sept. 16, 1953     2 Sheets—Sheet 2

INVENTOR:
Max Baermann
BY Richardsy Geier
ATTORNEYS

United States Patent Office 2,747,944
Patented May 29, 1956

2,747,944

BEARINGS FOR INSTRUMENTS AND MACHINES

Max Baermann, Bensberg-Wulfshof, Bezirk Koln, Germany

Application September 16, 1950, Serial No. 185,233

Claims priority, application Germany September 19, 1949

4 Claims. (Cl. 308—10)

This invention relates to instruments and machines having rotary parts, particularly measuring instruments such as electric counters with vertical shafts or gyrocompasses, turbo generators, small turbines, ultra centrifuges, etc. The invention is particularly concerned with magnetically and/or electrostatically operated, substantially frictionless bearings and centering means for the rotary parts of such instruments and machines.

The prior art rotary shafts of measuring instruments are provided with pointed ends and are supported at such ends on both sides; it is also possible to employ special step bearings and collar bearings for such purpose, and whenever high sensitivity is required, and the shifting forces are small, it is preferred to employ semi-precious stones, including so-called punched and capped jewels, as bearings.

It was found, however, that a certain amount of friction develops in the best bearings of this type, and this friction must be overcome by the adjusting forces of the indicating elements of the instruments, resulting in a less precise indication. Furthermore, the precision of the instruments is also detrimentally affected by a lengthy or continuous use which results in the wearing out of the bearings.

Other machines provided with rapidly rotating bodies, such as the rotors of gyro compasses, turbo generators, small turbines, ultra centrifuges, and the like, include a shaft which is usually positioned horizontally, and which must be driven as quickly as possible so that the size of the machine may remain small for a specific output.

Heretofore, however, the highest possible speed of rotation permitted by the material could not be used in such machines since the usual shaft bearings, such as ball bearings or roller bearings, were not capable of withstanding the strain after a short while.

In the construction of magnetic systems for this purpose it was found necessary to avoid an unstable equilibrium as a result of which the smallest shifting of the system results in a substantial change in the magnetic forces.

An object of the present invention is to provide a bearing for rotary parts of instruments and machines of the described type wherein magnetic and/or electrostatic forces are utilized to provide a perfectly stable and reliable balancing of the rotary parts.

Another object is to provide a magnetic and/or electrostatic bearing for rotors operated with a high speed.

A further object is to eliminate frictional losses in shaft bearings which are generally quite high in rapidly driven rotors.

Yet another object is to utilize the repelling forces between magnets to provide a bearing for machines or devices having a horizontally supported shaft.

A further object of the invention is to eliminate the drawbacks of prior art constructions and to provide a magnetic bearing wherein a stable equilibrium is attained, and wherein the rotating shaft need not function in its entirety as a magnet.

Other objects of the present invention will become apparent in the course of the following specification.

The objects of the present invention may be realized through the provision of magnetic bearings provided with magnets upon the rotary shaft and immovable casing, said magnets being so magnetized that they repel each other.

Due to this arrangement of repelling magnets the shaft which is being supported is held in place solely by symmetrical, radially directed repelling forces, thus providing a stable equilibrium in the radial direction. In order to attain this result the magnets are so arranged upon the shaft and the casing that the same poles are located opposite each other. For example, if a cylindrical magnet is located within the field of a ring-shaped magnet in such manner that the same poles are located opposite each other, then the magnetic axes of the two magnets will coincide automatically and by themselves, due to the repelling action of the magnetic poles, the magnets being shifted by these forces until their axes coincide. It should be noted that when the magnetic axes coincide completely and the same poles are uniformly located in relation to each other, i. e., when the magnetic zero lines also coincide, then the aggregate can receive only side forces, or such forces as are perpendicular to the magnetic axis. A slight shifting of the two zero lines in relation to each other, which does not influence the automatic adjustment of the magnets in relation to the coinciding of the magnetic axes, produces a force component extending in the direction of the shaft which may operate against the force of gravity of a vertically located shaft of a rotor, depending upon the shifting of the zero lines, whereby the force of gravity may be diminished or eliminated entirely. This shifting of the zero lines is quite small, and is shown exaggerated in the appended drawings.

In accordance with another preferred embodiment of the inventive idea, the axis of a rotor carries sleeve-shaped magnets located at opposed ends of the vertical shaft, each sleeve, or ring, magnet being magnetized axially and being enclosed by a ring magnet which is located concentrically thereto, and which is connected with the device, said magnet being also axially magnetized. This arrangement of two opposed systems of annular magnets improves the bearing most effectively since then the weights of the rotary parts which operate vertically, as well as forces exerted sidewise thereon, are practically completely compensated so that, theoretically speaking, no mechanical bearing is required, and it is merely necessary to provide special guides for centering and securing the axle. The magnetic forces, in accordance with this invention, may be so arranged that the axially magnetized ring magnets located upon the rotary axle and the ring magnets which are repelled by the first-mentioned ring magnets, and which are also axially magnetized, are located upon the casing or framework, the two systems of magnets being concentrical in relation to each other. In this constructional form the side forces are all absorbed so that the shaft is located centrally, substantially without friction, while step bearings are provided for the vertical forces of gravity.

In accordance with a further structural embodiment of the inventive idea, the bearing and the centering means for rotary bodies are improved by adding to the axially magnetized pairs of ring magnets a further disc-shaped annular magnet which is attached to the casing, and another similar magnet which is attached to the shaft, the two magnets being radially magnetized so that they repel each other.

This use of three magnetic systems, two of which involve axially magnetized magnets, while the third consists of radially magnetized magnets, produces a practically frictionless centering at the ends of a vertical rotary axle, and an extensive balancing of the weight of the rotary parts so that the shaft requires only one vertical support which may have the form of a cover plate upon the top end of the shaft; this plate will receive only small forces provided that the magnetic systems are properly adjusted.

In accordance with a further structural embodiment of the present invention, special requirements for bearings of horizontally located shafts on machines and instruments are met by concentrically combining three or more axially magnetized, ring-shaped permanent magnets to a single system which is located at a suitable distance from another corresponding system in such manner that the same poles are located opposite each other. This arrangement, however, provides a certain play of the machine shaft so that it is preferable to use it only for such machines and instruments wherein that amount of play is permissible between rotor and stator. The rotor will bend down somewhat with respect to the stator as the result of its weight, this shifting being caused by the elasticity of the magnetic support; however, this shifting may be easily balanced by a corresponding vertical shifting of the immovable part of the bearing. Furthermore, additional, normal bearings may be provided which will have for their purpose the limiting of the play to a permissible amount.

Through the use of groups of three or more axially magnetized annular permanent magnets combined into a system, the bearings constructed in accordance with the present invention may be employed for substantially heavy parts, since the repelling magnetic forces add to each other. This bearing may be used also for machines operating with a normal number of revolutions, for example, acid pumps which may be driven by means of a magnetic coupling and which would not require any attention. Then the magnets must be covered by acid-resisting layers.

The carrying capacity of the magnetic bearing constructed in accordance with the present invention may be further increased by the use of double arrangements of bearing systems whereby either the immovable or the rotary parts form a single body. A plurality of such double systems, each of which consists of two systems, may be arranged upon the shaft as desired to increase the carrying capacity thereof.

In accordance with another structural embodiment of the inventive idea, machines operating at high speeds, and having comparatively small diameters, may be created through the use of a magnetic bearing which is so constructed that annular, axially magnetized, permanent magnets are provided, one next to the other, upon the shaft, as well as upon the casing, the shaft and the casing being arranged stepwise, depending upon the forces which the shaft bears. In this construction the magnets of one body are located at a distance from each other, and are opposed to the magnets of the other body. Furthermore, each of the steps, or stages, of the stepwise arrangement may be provided with a plurality of ring-shaped systems.

It is apparent that in accordance with the present invention, magnetic forces may be effectively replaced by electrostatic forces which repel each other, and which are produced by electrically charged plates or rings consisting of electrets.

Hereinafter the terms "magnetic" and "magnet" are to be construed as including such electrostatic forces.

In constructions wherein high speeds are essential, it is advantageous to imbed the magnets in a non-magnetic substance of great strength, such as berylium bronze, in order to absorb the centrifugal forces.

Systems of bearings constructed in accordance with the present invention may be formed of uniform bearing elements in the same manner as is customary in conjunction with roller bearings, and such bearing systems may be built in the same manner.

The invention will appear more clearly from the following detailed description, when taken in connection with the accompanying drawings, showing, by way of example, preferred embodiments of the inventive idea.

Figure 1:
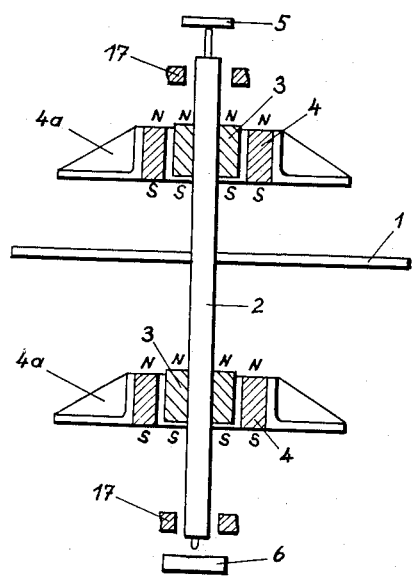
Figure 1 is a diagrammatic, sectional view of a counter shaft provided with two concentrical, axially magnetized pairs of annular magnets.

The bearing shown in Figure 1 of the drawings is used in conjunction with a counter provided with a counting disc 1 which is carried upon a vertical shaft 2. Two axially magnetized annular magnets 3 are firmly mounted upon the shaft 2, and are situated opposite annular magnets 4 which are attached to the casing 4a (partly shown). An annular space is formed between each pair of magnets 3, 4, the magnetic field being uniformly distributed.

A step bearing 5 is located at the top of the shaft 2 since the magnetic forces create an elastic bearing for the shaft 2, so that the plate 5 prevents the shaft 2 with the magnets 3 from leaving the magnetic field. The bottom of the shaft 2 is prevented from shifting vertically by a further bearing 6.

The two bearings 5 and 6 may be shifted axially by any suitable means (not shown) so as to adjust the position of the shaft 2 with the magnets 3 in such manner that the zero lines of the two pairs of annular magnets always coincide. The annular magnets 4 carried by the casing may be made movable for the same purpose (not shown).

It is apparent that as a result of this arrangement the shaft 2 remains in a stable equilibrium during its rotation, along with the counting disc 1.

It is further apparent that the same poles of the magnets 3 are located opposite the same poles of the magnets 4, thereby producing the repelling forces.

Annular guides 17 are located at opposite ends of the shaft 2. These guides do not engage the shaft 2 in operation, but serve as stops preventing excessive axial shifting.

Figure 2:
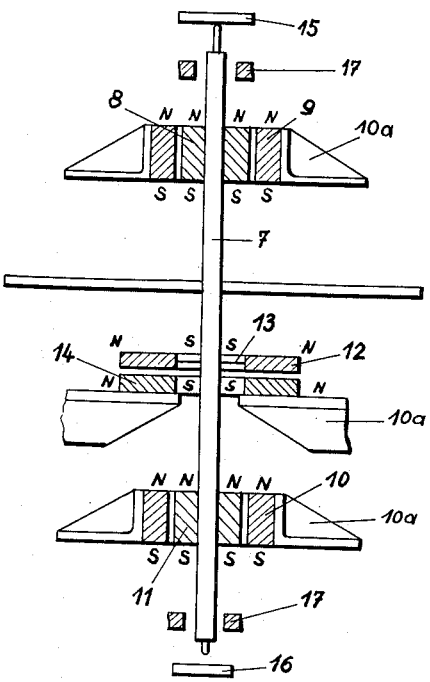
Figure 2 shows in longitudinal section a counter shaft which is centered by two axially magnetized pairs of annular magnets located upon the shaft itself, the balancing of the weight being attained by a pair of radially magnetized annular magnets.

In the construction shown in Figure 2, the vertical shaft 7 of a counting instrument carries annular axially magnetized magnets 8 and 11. An annular axially magnetized magnet 9 is located opposite the magnet 8. Similarly, an axially magnetized magnet 10 is located opposite the magnet 11, and is attached to the casing 10a (partly shown).

The shaft 7 also carries an annular magnet 12 which is firmly mounted upon the shaft by means of an intermediate support 13 consisting of a non-magnetic material. Another annular magnet 14 which is similar in form to the magnet 12 is located below the magnet 12, and is attached to the casing.

The magnets 12 and 14 are magnetized radially, and their poles are so arranged that they repel each other, thereby compensating to a substantial extent the vertical forces exerted upon the rotary parts of the instrument and produced mainly by the weight of these rotary parts.

A bearing 15 is provided at the top of the shaft 7, while a plate 16 is provided at the bottom of the shaft 5 to limit the downward movement thereof.

It is apparent that the construction of Figure 2 includes opposed axially magnetized pairs of magnets 8, 9 and 11, 10, as well as radially magnetized magnets 12, 14, all of said magnets having the same poles which oppose each other and, therefore, provide repelling forces.

The device is also provided with rings or guides 17 which are similar in construction and function to the guides 17 shown in Figure 1.

Figure 3:
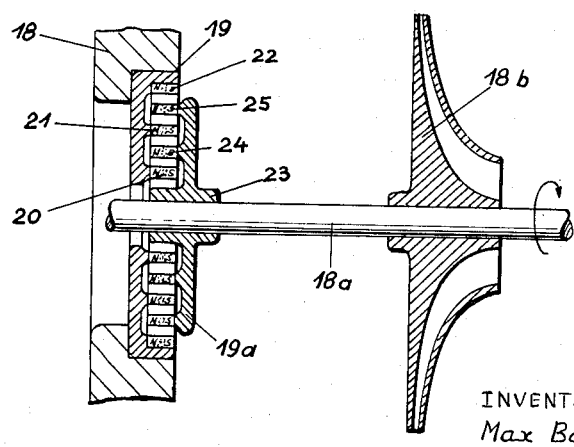
Figure 3 is a longitudinal section through a bearing system, one part of which is located upon the shaft while the other part is located in the casing.

The construction shown in Figure 3 consists of a machine having a casing 18 and a rotary shaft 18a carrying a rotor 18b. The magnetic bearing consists of systems 19 and 19a. The system 19 is immovable and consists of three concentrical, annular, permanent magnets 20, 21 and 22, which are magnetized in the direction of the shaft 18a and which are located at suitable distances from each other upon a support 19 carried by the casing 18. Rotary magnets 24 and 25 are located in the spaces between the magnets 20, 21 and 22. The magnets 24 and 25 are similar in construction to the magnets 20, 21 and 22, and are integral with a carrier 23, thus constituting a system 19a which is located opposite the system 19. The magnets 24 and 25 are also magnetized in the direction of the shaft 18a so that repelling forces are created between the magnets 20, 21 and 22, on the one hand, and the magnets 24 and 25, on the other hand.

It is apparent that the described bearing consists of two magnetic systems which make it possible to employ the bearing for fairly heavy rotary parts.

Figure 4:
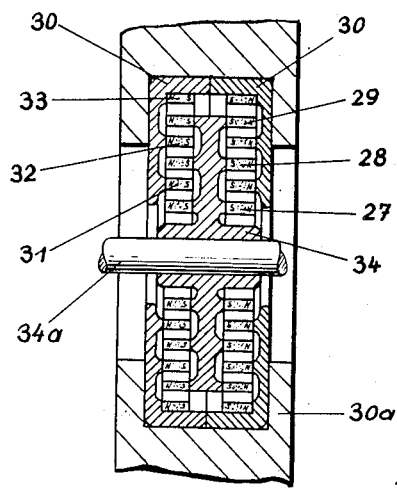
Figure 4 is a longitudinal section through a double bearing system.

The construction shown in Figure 4 includes the machine casing 30a carrying a support 30, which is firmly connected therewith. The support 30 is integral, or firmly connected, with annular magnets 31, 32 and 33, which are disposed concentrically. Rotary annular magnets 27, 28 and 29 are located in the spaces between the magnets 31, 32 and 33. The magnets 27, 28 and 29 are connected to, or integral with, a support 34 which is keyed upon the shaft 34a. Thus, the shaft 34a rotates along with the magnets 27, 28 and 29 in relation to the magnets 31, 32 and 33 of the casing 30a. The magnets are so disposed that their poles repel each other. In other respects the construction is similar to those already described.

Figure 5:
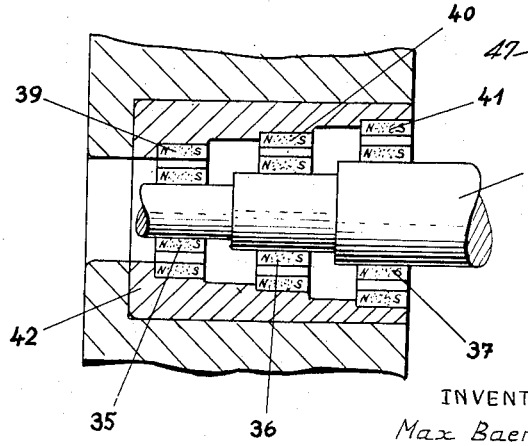
Figure 5 is a longitudinal section through bearing systems provided upon a stepwise shaft.

It is apparent that a concentrical arrangement of the annular magnets increases the diameter of the machine. In the construction shown in Figure 5 the magnets are located side by side, thereby eliminating this drawback. A shaft 38, having sections of different diameters, carries annular magnets 35, 36 and 37. Magnets 39, 40 and 41 are concentrical in relation to the magnets 35, 36 and 37, and are located opposite thereto with the same poles located opposite each other. The magnets 39, 40 and 41 are firmly mounted in the immovable casing 42, which corresponds in shape to that of the shaft 38. The casing 42 is carried by the machine frame.

This construction is most suitable for high speed rotary parts, and is similar in operation to those already described.

Figure 6:
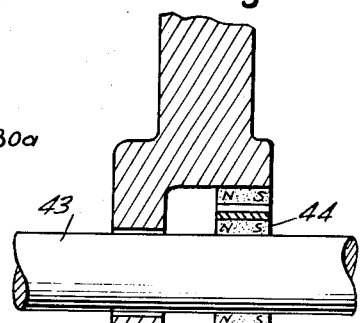
Fig. 6 is a longitudinal section through a bearing system provided with a covered magnet.

In the construction shown in Fig. 6 an annular magnet 44 is firmly mounted upon the shaft 43 and is enclosed by a ring 45 consisting of a non-magnetic material. The opposed ring 46 consists of permanent magnetic steel and is firmly mounted in the support 47.

The following principles are to be considered in the manufacture of all the above-described embodiments of the inventive idea:

As is well known, practically all magnetic substances create magnetic fields, the strength of which is not absolutely uniform as a result of variations in the degree of magnetizing, lack of homogeneity of the substance itself, etc. This lack of uniformity can create losses produced by eddy currents, particularly when the machine is operated with a high number of revolutions. It is, therefore, advantageous to use such permanent, magnetical substances which are made from comminuted, permanently magnetic material held by an insulating binder.

It is particularly suitable to employ permanently magnetic substances of small permeability, the coercive force of which is higher, however, than 300 oersted.

This selection of the material is caused by the fact that with an increase in the coercive force and smaller permeability the magnetic losses are diminished.

It is apparent that the specific illustrations given above have been shown by way of illustration and not by way of limitation, and that they are subject to wide variations and modifications without departing from the scope or intent of the invention, all of which variations and modifications are to be included within the scope of the present invention.

The term "tensile strength" as used in the specification and claims is intended to designate the resistance of a material to tear action by a load.

What is claimed is:

1. A bearing for instruments and machines, comprising a rotary shaft, a casing at least partly enclosing said shaft, at least one mechanical support for said shaft, a cylindrical axially magnetized permanent magnet mounted upon said shaft and rotatable therewith, and a second cylindrical axially magnetized permanent magnet firmly mounted upon said casing concentrically to the first-mentioned magnet and enclosing the first-mentioned magnet, said magnets having poles of the same polarity located opposite each other, whereby the magnets repel each other, and a ring of non-magnetic material of high tensile strength which encloses the first-mentioned magnet.

2. A bearing for instruments and machines, comprising a rotary shaft, a casing at least partly enclosing said shaft, at least one mechanical support for said shaft, a carrier connected with said shaft, a plurality of cylindrical axially magnetized permanent magnets concentrically supported upon said shaft by said carrier in spaced relationship to each other and enclosing each other, said magnets and said carrier rotating along with said shaft, and a corresponding number of other cylindrical axially magnetized magnets enclosing each other and concentrically mounted in spaced relationship upon said casing, the first-mentioned magnets extending into the spaces between said other magnets, the two groups of magnets having poles of the same polarity located opposite each other, whereby magnets of one group repel magnets of the other group.

3. A bearing for instruments and machines, comprising a rotary shaft, a casing at least partly enclosing said shaft, at least one mechanical support for said shaft, a carrier connected with said shaft, a pair of groups of permanent magnets supported next to each other axially upon said shaft by said carrier, each of said groups comprising a plurality of cylindrical concentrical axially magnetized permanent magnets disposed in spaced relationship to each other and enclosing each other, said magnets and said carrier rotating along with said shaft, and another pair of groups of permanent magnets mounted adjacent to each other axially upon said casing, each of said other groups comprising a plurality of cylindrical concentrical axially magnetized permanent magnets disposed in spaced relationship to each other and enclosing each other, the magnets of the first-mentioned pair of groups extending into the spaces between the magnets of said other pair of groups, the two pairs of groups of magnets having poles of the same polarity located opposite each other, whereby magnets of one pair of groups repel magnets of the other pair of groups.

4. A bearing for instruments and machines, comprising a rotary shaft, a casing at least partly enclosing said shaft, at least one mechanical support for said shaft, a plurality of cylindrical axially magnetized permanent magnets mounted upon said shaft and spaced axially thereon, said magnets rotating along with said shaft, and an equal number of other cylindrical axially magnetized permanent magnets concentrically enclosing the first-mentioned magnets and equally spaced from each other, said other magnets being mounted in said casing, the two poles of all magnets repelling each other, said shaft and said casing consisting of sections of different diameters.

References Cited in the file of this patent

UNITED STATES PATENTS

| | | |
|---|---|---|
| 2,254,698 | Hansen | Sept. 2, 1941 |
| 2,436,939 | Schug | Mar. 2, 1948 |
| 2,560,260 | Sturtevant et al. | July 10, 1951 |
| 2,576,679 | Guillaud | Nov. 27, 1951 |
| 2,704,231 | Goldsmith | Mar. 15, 1955 |

FOREIGN PATENTS

| | | |
|---|---|---|
| 539,409 | Great Britain | Sept. 9, 1941 |
| 642,353 | Great Britain | Aug. 30, 1950 |